United States Patent
Hockaday

[11] Patent Number: 5,989,685
[45] Date of Patent: Nov. 23, 1999

[54] ELECTREET FILM COMPOSITION ADAPTED FOR PRINTING ON INKJET PRINTERS

[75] Inventor: Robert G. Hockaday, Los Alamos, N.Mex.

[73] Assignee: Permacharge Corporation, Rio Rancho, N.Mex.

[21] Appl. No.: 08/858,962

[22] Filed: May 20, 1997

[51] Int. Cl.⁶ .................................................. B32B 9/00
[52] U.S. Cl. ........................ 428/195; 428/48; 428/58; 428/131; 428/137; 428/204; 428/207; 428/221; 428/411.1; 428/542.2; 428/904.4; 430/48; 430/156; 101/212; 101/253; 101/489
[58] Field of Search ................................ 428/195, 542.2, 428/542.8, 904.4, 131, 221, 411.1, 137, 220, 48, 58, 204, 207; 101/489, 253, 212; 430/156, 48, 60

[56] References Cited

U.S. PATENT DOCUMENTS

| | | | |
|---|---|---|---|
| 3,833,409 | 9/1974 | Peshin | 117/218 |
| 5,477,784 | 12/1995 | Floegel | 101/489 |

*Primary Examiner*—Deborah Jones
*Assistant Examiner*—Abraham Bahta
*Attorney, Agent, or Firm*—Calvin B. Ward

[57] ABSTRACT

A printing sheet that is adapted for printing in an inkjet printer or the like. The sheet has a plurality of pits in the top surface. The pits accept the ink and hold the ink in place. The bottom surface of the sheet has a permanent electrostatic charge. The sheet may be constructed by etching an electreet compatible plastic sheet and then polling the sheet. Alternatively, the sheet may be constructed by bonding a porous sheet to an electreet sheet.

8 Claims, 1 Drawing Sheet

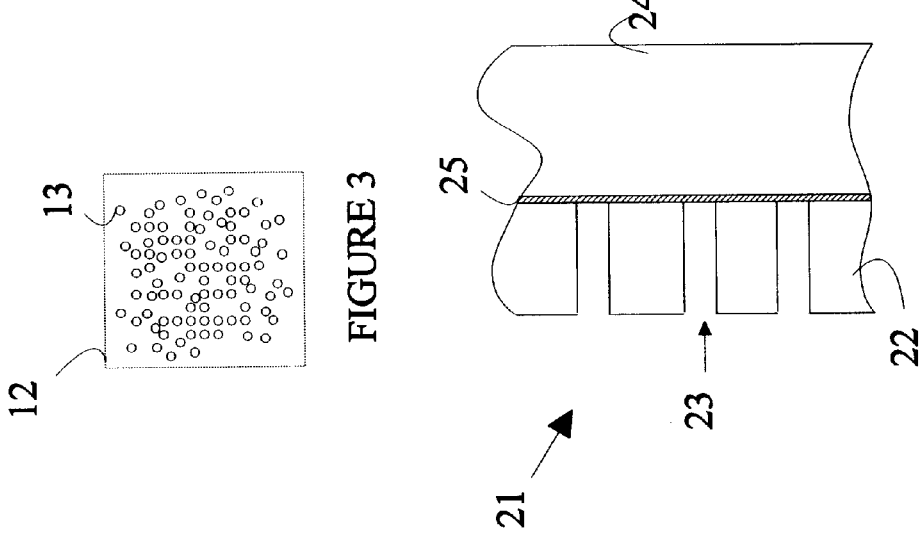
FIGURE 3
FIGURE 4
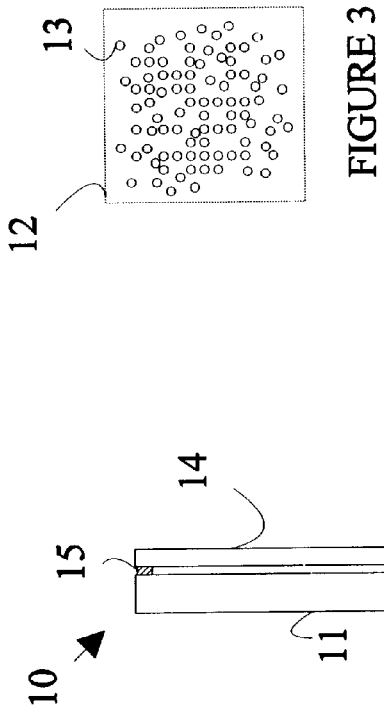
FIGURE 2
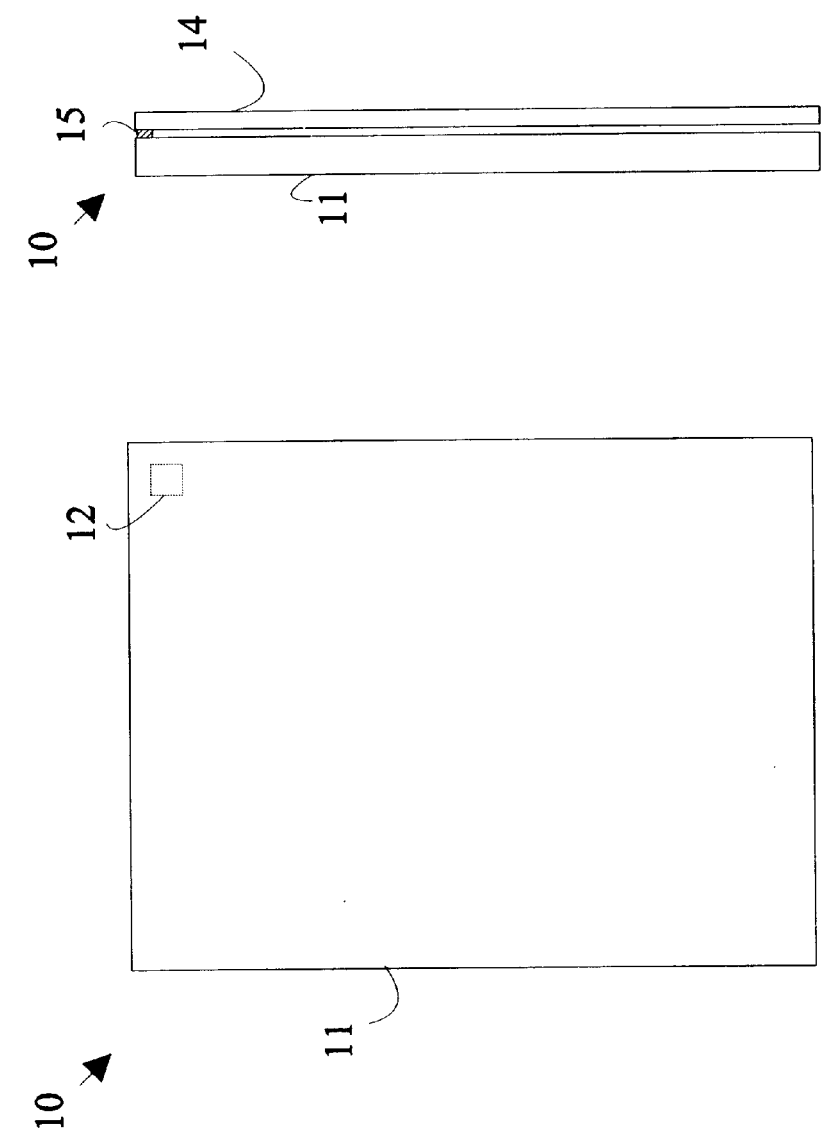
FIGURE 1

ELECTREET FILM COMPOSITION ADAPTED FOR PRINTING ON INKJET PRINTERS

FIELD OF THE INVENTION

The present invention relates to computer printers and printing materials for use therein, and more particularly, to a computer printing material that will adhere electrostatically to nonconducting surfaces.

BACKGROUND OF THE INVENTION

Modern desktop publishing has made possible the production of one of a kind posters and other displays. A user of a conventional personal computer equipped with any one of a number of inexpensive printers can create professional quality artwork and displays. If the user also has access to a scanner, the user can input almost any type of artwork and modify the artwork for inclusion in the user's own creation.

While the ability to generate custom artwork has advanced rapidly, the ability to "hang" the art work has not progressed so rapidly. The options for displaying the artwork can be more or less summarized as "glue", "frame", or "project". Framing is not cost effective for many temporary displays. In addition, the frame must be mounted on the surface by a fastener or the like. Such fasteners can damage the surface.

Transparency materials for use with overhead projectors have been available for some time. Unfortunately, one needs a projector for each display. While such systems are practical for presentations to groups in business or educational settings, these systems are far from adequate in terms of serving the needs of an artist or teacher who wishes to hang a picture on a wall.

Printer compatible papers with glue backing are also known to those skilled in the publishing arts. These vary in sizes from small printer labels to full sized sheets. An art work printed on an adhesive backed sheet may be stuck to a surface without the need to frame the art work or damage the surface by the application of fasteners. Unfortunately, such adhesive backed sheets have a number of problems. First, the artwork cannot, in general, be removed from one location and reapplied at another location more than a few times without the adhesive failing. In addition, some of the adhesives used in these sheets leave a residue on the surface. Furthermore, the adhesives used with some of these papers such as those used for labels are sufficiently strong that the paper may not be removed from surfaces such as glass without destroying the artwork. In some cases, the art work must be scraped from the surface using a razor blade or the like.

One type of material that holds the promise of providing a display which sticks to a surface without the use of fasteners or adhesives are the electreets. For the purposes of the present discussion, an electreet will be defined to be a plastic sheet which carries a permanent electrostatic charge. Such sheets can be generated by passing the plastic sheet through an electric field while the sheet is held at an elevated temperature. The sheet is then cooled before the induced electric diople moment generated by the field has time to dissipate. The resulting plastic sheet will stick to most clean insulating surfaces. Furthermore, the sheet may be easily removed and reapplied to another surface.

Electreet compositions for making posters have been described in the prior art. Pads of sheets are commercially sold for use during presentations as a replacement for conventional "white boards". These sheets are typically made from polypropline which is a few thousandths of an inch thick.

The sheets may be printed via conventional offset printing techniques provided they are recharged after the printing process. Offset printing systems heat the sheets after the application of the ink to dry the ink. The increase in temperature results in a loss of some or all of the induced dipole moment in the sheet. U.S. Pat. No. 5,477,784 describes a printing arrangement in which the sheets are recharged during the drying process. While such recharging systems may be incorporated into large offset presses, they do not represent a viable solution at the desktop publishing level, since they require modifications of the existing printers to include high voltage charging electrodes.

In principle, electreets should be capable of use with inkjet printers, since these printers do not subject the printer paper to high temperatures. However, there have been a number of problems that have prevented their use. First, the plastics that can be most conveniently used for electreets such as polypropylene do not lend themselves to inkjet printing. The inks used in inkjet printers do not absorb onto the surface of these materials. As a result, the printed image easily wipes off the printed sheet even after the ink has dried. In addition, the quantity of ink that can be deposited without "running" is too small to provide the color intensity variations needed for realistic image printing.

Second, the electreet sheets present a number of problems with respect to the sheet feeders used in these printers. To be cost effective, relatively thin sheets must be used. These sheets are too flexible to feed properly in many paper handling systems. Furthermore, individual sheets in a stack of electrostatically charged sheets in a sheet feeder tend to stick together because of the electrostatic charge. This further complicates the sheet feeding problem.

Broadly, it is the object of the present invention to provide an improved printing material that incorporates the advantages of electreets.

It is another object of the present invention to provide a printing material that may be printed in inkjet printers without suffering from the paper feed problems described above.

It is yet another object of the present invention to provide an electreet based printing material that accepts the inks used in inkjet printers.

These and other objects of the present invention will become apparent to those skilled in the art from the following detailed description of the invention and the accompanying drawings.

SUMMARY OF THE INVENTION

The present invention comprises a printing sheet that is adapted for printing in an inkjet printer or the like. The sheet has a plurality of pits in the top surface. The pits accept the ink and hold the ink in place. The bottom surface of the sheet has a permanent electrostatic charge. The sheet may be constructed by etching an electreet compatible plastic sheet and then polling the sheet. Alternatively, the sheet may be constructed by bonding a porous sheet to an electreet sheet.

BRIEF DESCRIPTION OF THE DRAWINGS

FIG. 1 is top view of a printing material 10 according to the present invention.

FIG. 2 is a side view of printing material 10.

FIG. 3 is an enlarged view of region 12 shown in FIG. 1.

FIG. 4 is an enlarged cross-sectional view of a second embodiment of a printing material according to the present invention.

DETAILED DESCRIPTION OF THE INVENTION

The present invention may be more easily understood with reference to FIGS. 1–3. FIG. 1 is a top view of printing material 10 according to the present invention. FIG. 2 is a side view of printing material 10. FIG. 3 is an enlarged view of region 12 shown in FIG. 1. The present invention is an electreet based printing "paper" that accepts ink in a manner that allows the ink to dry and become bonded to the paper. In the preferred embodiment of the present invention, the plastics that are preferably used as the base materials for the electreet are modified to provide a surface that contains holes or "pits" 13 that extend partially into the surface of sheet 11. The holes absorb the ink. Once the ink has dried in the holes, the ink will not easily rub off. In the preferred embodiment of the present invention, the holes do not extend completely through the surface of the electreet sheet. Hence, the wet ink will not leak out the back side of the electreet sheet before it dries.

The pits may be generated by any number of processes. In one embodiment of the present invention, a sheet of polypropylene is bombarded by charged particles that partially penetrate into the sheet. Each charged particle damages the bonds in the plastic along its trajectory. The damaged area is then etched to form a cylindrical pore having an axis that is perpendicular to the surface of the sheet.

Radiation damage etching of this type is well known to those in the art, and hence, will not be discussed in detail here. However, to clarify the preceding discussion, one example of a radiation damage process that has been found to provide satisfactory plastic sheets will be described.

In the embodiment of the present invention, polypropylene sheets are used as the starting material. The sheets are irradiated with fission fragments from $U^{235}$. These ionized fission fragments have roughly 1.93 MeV per Nucleon in kinetic energy. Typical ions are $Zr^{91}$ with 77 MeV of kinetic energy and $La^{139}$ with 110 MeV of kinetic energy. The range of these charged particles in the plastic is roughly 10 $\mu$m. The preferred dose levels are in the range of $1\times10^5$ to $1\times10^9$ particles per $cm^2$. The particle dose level and subsequent etch duration are used to control the porosity of the plastic.

The irradiated plastic sheets are exposed to oxygen for a period of time sufficient to oxidize the plastic along damaged track. The oxidized sheets are then etched at 94° C. in a sulfuric acid potassium dicromate solution (87% by weight, 30% sulfuric acid, and 12.6% potassium dichromate ($K_2Cr_2O_7$)) for a period of time determined by the desired hole diameter. The resulting pores are on the outer surface of the plastic sheet and extend a distance of approximately 10 $\mu$m into the surface of the sheet.

While the resulting plastic sheet will absorb ink, the absorption is limited by the hydrophobic nature of the starting material. In the preferred embodiment of the present invention, the plastic is treated further to render the surface hydrophilic if the particular etchant used has not already rendered the surface sufficiently hydrophilic. The surface may be rendered hydrophilic by coating the surface with a surfactant. A surfactant can be added to the etching solution or the plastic sheets can be coated with a surfactant after the etching solution has been rinsed from the plastic sheets. Dawn™ soap dissolved in 95% ethanol is suitable for coating the rinsed sheets. A solution of 1 part soap to 20 parts ethanol has been found to be satisfactory. Other surfactants or wetting agents may be used. For example, a detergent such as Triton™ may be used in place of the soap.

The plastic sheets are converted to electreets after drying by heating and preferably stretching the sheets in a polling electric field. In the preferred embodiment of the present invention, the plastic sheet is passed through heated rollers, stretched as it exits the rollers, and a DC corona is discharged through the plastic normal to the plastic surface as it cools. This process electrostatically poles the plastic to make it a permanent electreet. The amount of poling can be adjusted by adjusting the corona discharge voltage, maximum temperature in the plastic film, and amount of stretch in the plastic. The film is heated to a temperature ranging from 60° C. to 120° C. depending upon the type specific film composition.

The charging phase can be accomplished by a number of methods. These include, but are not limited to, (1) AC or DC Corona discharge, (2) simple polarization in a strong DC or AC field, (3) plasma treatment, and (4) combinations of the above three. In a preferred embodiment, the film is treated with a DC corona discharge at a potential of between 5 KV and 20 KV.

As noted above, charged sheets present problems in the paper feed mechanisms of some printers. The problems result from the thickness of the plastic sheets and from the electric charge on the sheets. Both of these problems can be reduced by backing the sheets with a sheet of paper 14 which is attached to the electreet sheet 11 over a small area using an adhesive 15.

Paper backings for conventional inkjet transparencies are known in the art. Conventional inkjet transparency blanks are often shipped with a sheet of white paper glued to the plastic along one edge. These backing sheets allow one to see the material printed on the transparency without holding the transparency up to the light. The transparency itself is sufficiently thick to properly feed in most conventional printers. Hence, the conventional backing sheets are not needed to stiffen the plastic.

In the preferred embodiment of the present invention, backing sheet 14 is incorporated to stiffen the plastic sheet and to reduce the sticking of the sheets to each other in the paper feed tray. Since the plastic is electrostatically charged, it clings to the backing sheet along the entire surface of the sheet. The glued edge serves only to maintain the sheets in the proper alignment in the event the sheets become partially separated for some reason. Since the paper backing sheet is not an electreet, the adhesion of the sheets in the paper tray is significantly reduced, since each plastic surface is in contact with a sheet of paper as opposed to the opposite charged surface of the adjacent plastic sheet.

The above described embodiments of the present invention utilize a plastic sheet that has been pitted to create an ink adsorbing surface. A second embodiment of the present invention utilizes a two layer composition in which the top layer 22 consists of a porous sheet of plastic having holes 23 extending completely therethrough as shown in FIG. 4. A suitable porous polypropylene material having a thickness of approximately 38 $\mu$m may be obtained from 3M Corporation (Product Number 55144-1000). This sheet is then bonded to a second, non-porous sheet 24. Thin porous sheets of polyprolyene are mass produced for use in diaper linings, and hence, the costs inherent in radiation damage etching are avoided. The porous sheet may be bonded to a sheet of polypropylene using an adhesive consisting of 1 part Crodalam 29-103 and 7 parts Crodalam 29-102 (Croda Adhesives, Inc., 1000 Hollywood Ave, Itasca, Ill. 60143). The bonded sheets are then polled as described above.

Alternatively, the porous sheet may be bonded to a polled sheet of polypropylene. If the two bonded sheets are polled after bonding, the bonding cement must withstand the polling conditions without distorting the bonded sheets. If, however, the sheets are bonded after polling, this constraint on the choice of bonding cement is removed.

A two sheet composition in which the top sheet is not polled has the further advantage of reduced inter-sheet adhesion in the paper tray of the printer. The top surface of the printing composition is not polled. The bottom surface is bonded to a backing sheet as described above. Hence, there is no charged surface on either side of the sheet in the printer tray to stick to an adjacent sheet in the tray.

As noted above, the diameter of the holes in the plastic sheet is controlled by the etching conditions if radiation damage etching is utilized. If the hole diameter is selected to be much smaller than the wavelength of light, the sheet will appear transparent if the original material was transparent. Hence, for transparent sheets, a hole diameter of 20 nm or less is preferred.

In embodiments utilizing a porous sheet bonded to a backing sheet, a reflective coating 25 can be incorporated on the backing sheet. Thus light that is not absorbed by the ink is reflected back and has a second chance to be absorbed. This provides the benefits of a sheet that is twice as thick in terms of range of light intensity that may be generated by the ink.

Various modifications to the present invention will become apparent to those skilled in the art from the foregoing description and accompanying drawings. Accordingly, the present invention is to be limited solely by the scope of the following claims.

What is claimed is:

1. A printing sheet, comprising:

a substrate having a top surface and a bottom surface;

said top surface comprising a plurality of pits therein; and said bottom surface having an electrostatic charge.

2. The sheet of claim 1 wherein said top surface is coated with a surfactant which renders the sides of said pits hydrophilic.

3. The sheet of claim 1 further comprising a backing sheet, said backing sheet being in contact with said bottom surface and attached thereto by an adhesive bond.

4. The sheet of claim 1 wherein said sheet comprises polypropylene.

5. The sheet of claim 1 wherein said sheet is transparent to light and wherein the maximum dimension of said pits is less than 20 nm.

6. A printing sheet comprising:

a first sheet having holes extending therethrough; and a second sheet having an electrostatic charge thereon, wherein said first and second sheets are bonded together such that said holes in said first sheet are blocked by said second sheet.

7. The sheet of claim 6 further comprising a backing sheet, said backing sheet being in contact with said second sheet and attached thereto by an adhesive bond.

8. The sheet of claim 7 wherein said second sheet comprises polypropylene.

* * * * *

UNITED STATES PATENT AND TRADEMARK OFFICE
CERTIFICATE OF CORRECTION

PATENT NO. : 5,989,685
DATED : 11/23/99
INVENTOR(S) : Hockaday

It is certified that error appears in the above-identified patent and that said Letters Patent is hereby corrected as shown below:

Column 4, line 55 – Replace "adsorbing" with - - absorbing - -

Signed and Sealed this

Eighteenth Day of July, 2000

Attest:

Q. TODD DICKINSON

*Attesting Officer*  *Director of Patents and Trademarks*